Jan. 16, 1962   R. E. ENGLAND ETAL   3,017,484
DIELECTRIC HEATING
Filed March 1, 1960

RICHARD E. ENGLAND
WILLIAM R. McCULLOUGH
INVENTORS

BY John R. Faulkner
Thomas H. Oster

ATTORNEYS 3,017,484
DIELECTRIC HEATING
Richard E. England, Birmingham, and William R. McCullough, Livonia, Mich., assignors to Ford Motor Company, Dearborn, Mich., a corporation of Delaware
Filed Mar. 1, 1960, Ser. No. 12,071
2 Claims. (Cl. 219—10.53)

This invention is concerned with the field of dielectric heating and is more particularly directed to an apparatus useful in welding together films of unsupported heat softenable plastic material such as the so-called vinyl plastics of commerce.

Figure 1:
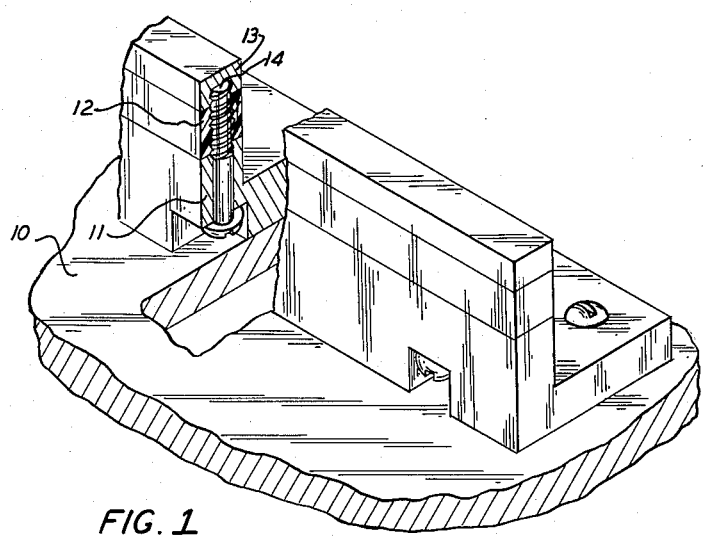
Figure 2:
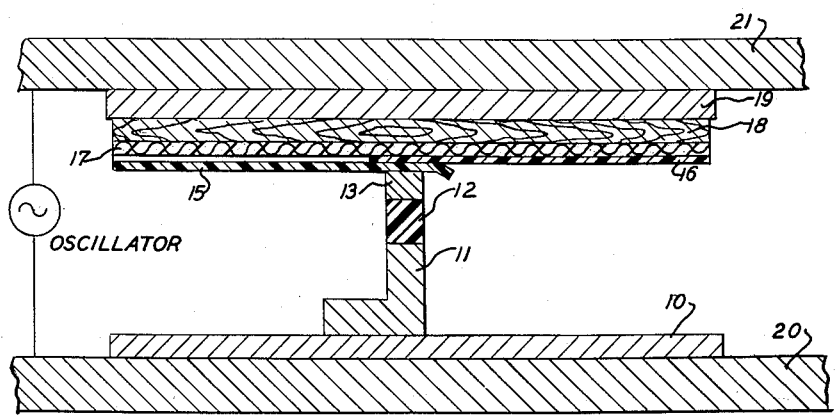

This invention is more readily understood by reference to the figures of drawing in which:

FIGURE 1 is a perspective view of a portion of the dielectric heating means partially in section, and, FIGURE 2 is a sectional view through the dielectric heating apparatus with the work to be welded together in place.

Dielectric heating has long been used in specialized applications where it is desired to heat uniformly and quickly a material which is an electrical non-conductor. A detailed treatise on the technology of this subject will be found in a publication entitled Theory and Application of Industrial Electronics, by Gage, 1951, pages 202 and 213. Dielectric heating has long found utility in the automotive industry in fabricating the plastic interior trim.

This invention relates to a particular facet of the task of fabricating interior vehicle trim. It is desirable in many instances to weld together unsupported vinyl plastic films. The inventors have discovered that this welding can be accomplished in less time and with less expenditure of electrical energy if the portion of the electrode in contact with the vinyl film is maintained at an elevated temperature by conventional means such as steam or hot water passages or embedded resistance elements. However, these devices are costly and add unwanted complications to the apparatus.

The inventors have simplified the problem of maintaining the desired temperature in the electrodes by providing the structure with a working cap directly in contact with the vinyl plastic film and thermally insulating this cap from the remainder of the electrode structure. It is, of course, necessary that the cap and the remainder of the electrode be connected electrically.

In FIGURE 1 there is shown an electrode structure comprising a base plate 10, a base 11 secured to base plate 10, an insulator 12 and a working cap 13. Base 11, insulator 12 and working cap 13 are held in assembled relationship by screw member 14 which also serves to establish electrical contact between working cap 13 and base 11.

In FIGURE 2 there is shown a cross section through a dielectric heating and welding device adapted to the welding of unsupported vinyl strips with the work to be welded in place. It will be noted that vinyl film 16 is lapped over vinyl film 15 directly over working cap 13. In the assembly of certain trim items vinyl film 15 and vinyl film 16 are backed up by a bat 17 and a sheet of hardboard 18. Upper plate 19 is employed along with base plate 10 to contain the assembly.

This assembly is placed in a suitable press between lower press plate 20 and upper press plate 21. Oscillator 22 serves to impress a radio frequency voltage upon the assembly. Means not shown are provided to move upper press plate 21 and lower press plate 20 together.

The thickness of working cap 13 and insulator 12 are regulated in accordance with the prospective work schedule to keep working cap 13 at the desired temperature. The thinner working cap 13 is made in a vertical direction, the higher will be the temperature attained. Similarly, the thicker insulator 12 is made, the higher will be the temperature. The heat employed to heat working cap 13 is derived almost exclusively from the vinyl film and not directly from the dielectric heating effect. Hence to start up a cold press it may be necessary to initially heat cap 13 as by the use of a dummy assembly.

In a successful working machine, the cap 13 had a thickness of one-eighth inch and was supported upon a red fibre insulator one-quarter inch thick. The temperature of the cap ranged between 140° to 160° F. in comparison with temperatures of other parts of the die of 110° to 120° F.

Working cap 13 has been shown secured to base 11 by screw means. This has been done by way of example only and it is to be understood that other means such as pins or adhesives may be used. In any event electrical contact must be maintained between the working cap and the base.

We claim:

1. A dielectric heating apparatus suitable for welding together films of unsupported heat softenable plastic comprising an upper plate, a base plate, means for urging together the upper plate and base plate and an oscillator connected to the base plate and upper plate, the base plate supporting a metallic cap for the concentration of the heating of the heat softenable plastic composition into a relatively narrow band, said metallic cap being electrically connected to the base plate, but thermally insulated therefrom said metallic cap comprising a rigid, massive metal member which presents a metallic highly conductive working surface to the films of unsupported heat softenable plastic.

2. A dielectric heating apparatus suitable for welding together films of unsupported heat softenable plastic comprising an upper plate, a base plate, means for urging together the upper plate and base plate and an oscillator connected to the base plate and the upper plate, at least the base plate supporting a metallic cap, said metallic cap being electrically connected to the base plate, but thermally insulated therefrom said metallic cap comprising a rigid, massive metal member which presents a metallic highly conductive working surface to the films of unsupported heat softenable plastic.

References Cited in the file of this patent
UNITED STATES PATENTS

| | | |
|---|---|---|
| 2,565,161 | Wilmotte et al. | Aug. 21, 1951 |
| 2,766,363 | Schwartz et al. | Oct. 9, 1956 |
| 2,806,116 | Hoagland | Sept. 10, 1957 |